United States Patent [19]

Sheehy

[11] Patent Number: 4,933,938

[45] Date of Patent: Jun. 12, 1990

[54] GROUP ADDRESS TRANSLATION THROUGH A NETWORK BRIDGE

[75] Inventor: David B. Sheehy, Roseville, Calif.

[73] Assignee: Hewlett-Packard Company, Palo Alto, Calif.

[21] Appl. No.: 326,957

[22] Filed: Mar. 22, 1989

[51] Int. Cl.$^5$ .............................................. H04J 3/02
[52] U.S. Cl. ................................................. 370/85.13
[58] Field of Search ...................... 370/86, 85, 88, 94, 370/85.13, 85.14; 340/825.05

[56] References Cited

U.S. PATENT DOCUMENTS

| | | | |
|---|---|---|---|
| Re. 31,852 | 3/1985 | Soderblom | 370/90 |
| 4,718,060 | 1/1988 | Oguchi et al. | 370/88 |
| 4,769,814 | 9/1988 | Bederman et al. | 370/85 |
| 4,771,286 | 9/1988 | Niessen et al. | 370/85 |
| 4,789,982 | 12/1988 | Coden | 370/85 |

OTHER PUBLICATIONS

"Draft Addendum to ANSI/IEEE Std 802.5-1988 Token Ring MAC & PHY Specification Enhancement for Multiple-Ring Networks", prepared by the IEEE 802.5 Rapporteur on Multiple-Ring Networks IEEE, Inc., Dec. 9, 1988, pp. 1-25.

Primary Examiner—Benedict V. Safourek
Assistant Examiner—Wellington Chin

[57] ABSTRACT

A method for handling data frames by a bridge between a first network which implements group addressing and a second network which implements functional addressing but does not permit multiple group addressing. A first memory within the bridge receives data frames from the first network and from the second network. The data frames each have a destination address. A system memory within the bridge includes an address table and a translation table. Each entry in the address table has a first field which is a destination address and a second field which indicates if the destination address addresses more than a single station. When the first memory receives from the first network a first data frame having a first destination address, a system processor within the bridge searches the address table for the first destination address to determine whether the first destination address addresses more than a single station. If so, the system processor searches the translation table for a first group address which matches the first destination address and substitutes for the first destination address a first functional address corresponding to the first group address before forwarding the first data frame on the second network.

7 Claims, 3 Drawing Sheets

GROUP ADDRESS TRANSLATION THROUGH A NETWORK BRIDGE

Background

The present invention concerns the transfer of data from a first network through a bridge to a second network when the second network provides inadequate facility for group addressing.

In most networks it is desirable to be able to address a single message to a plurality of destinations. For instance, the network standard provided in Draft Addendum to ANSI/IEEE Standard 802.5-1988 Token Ring MAC & PHY Specification Enhancement for Multiple-Ring Networks; December 9, 1988, Prepared by the IEEE 802.5 Rapporteur on Multiple-Ring Networks; Institute of Electrical and Electronic Engineers, Inc., provide for the use of group messages among stations. However, some major vendors who have manufactured chip sets which purportedly implement network interfaces according to the above standard have not adequately provided for group addressing of messages. This presents difficulties when there is an attempt to add to such a network a bridge to a different type of network that supports more robust group addressing.

Summary of the Invention

In accordance with the preferred embodiment of the present invention a method for handling data frames by a bridge between a first network which implements group addressing and a second network which implements functional addressing but not ordinary group addressing is presented. The bridge includes a first memory, a system processor and a system memory. The first memory receives data frames from the first network and from the second network. The data frames each have a destination address. The system memory includes an address table and a translation table. In the address table are a plurality of entries. Each entry has a first field which is a destination address and a second field which indicates if the destination address addresses more than a single station. For every entry in the first field for which the second field indicates the destination address addresses more than a single station the translation table containing a group address recognized on the first network and a corresponding functional address recognized on the second network.

When the first memory receives from the first network a first data frame having a first destination address, the system processor searches the address table for the first destination address. If the system processor determines from the address table that the first destination address addresses more than a single station the system processor searches the translation table for a first group address which matches the first destination address. The system processor then substitutes for the first destination address a first functional address corresponding to the first group address before forwarding the first data frame on the second network.

Similarly, when the first memory receives from the second network a second data frame having a second destination address, the system processor searches the address table for the second destination address. If the system processor determines from the address table that the second destination address addresses more than a single station the system processor searches the translation table for a second functional address which matches the second destination address. The system processor then substitutes for the second destination address a second group address corresponding to the second functional address before forwarding the second data frame on the first network.

Description of the Preferred Embodiment

Figure 1:
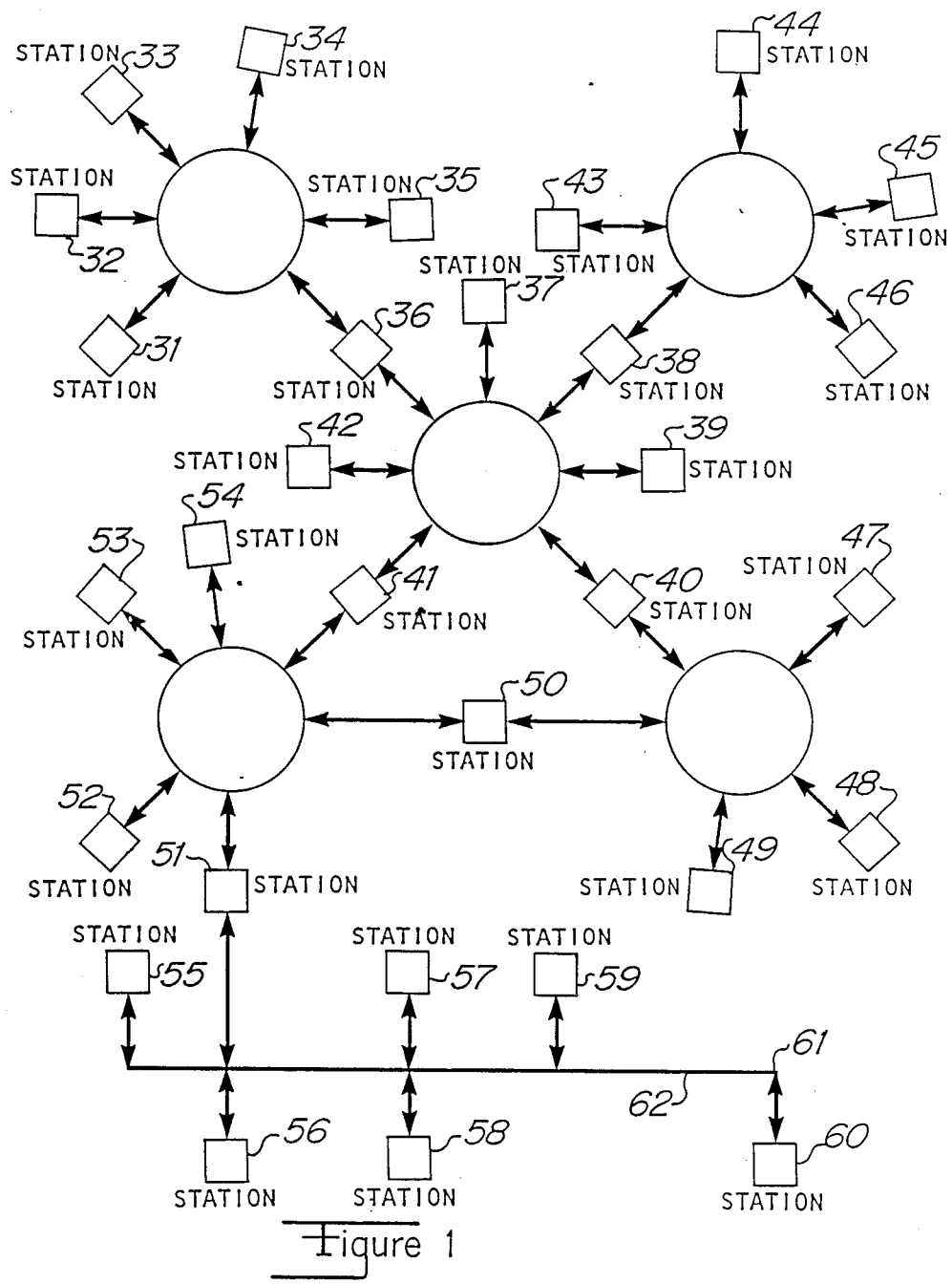
FIG. 1 shows a bus network joined through a bridge to a multiple ring network in accordance with the preferred embodiment of the present invention.

FIG. 1 shows a block diagram of a multiple ring network. A first network ring 21 consists of a station 31, a station 32, a station 33, a station 34, a station 35 and a station 36 joined together as shown. A second network ring 22 consists of station 36, a station 37, a station 38, a station 39, a station 40, a station 41 and a station 42 joined together as shown. A third network ring 23 consists of station 38, a station 43, a station 44, a station 45, and a station 46 joined together as shown. A fourth network ring 24 consists of station 40, a station 47, a station 48, a station 49 and a station 50 joined together as shown. A fifth network ring 25 consists of station 41, station 50, a station 51, a station 52, a station 53 and a station 54 joined together as shown.

Various stations function as bridges between the network rings. For example, station 36 functions as a bridge between network ring 21 and network ring 22. Station 38 functions as a bridge between network ring 22 and network ring 23. Station 40 functions as a bridge between network ring 23 and network ring 24. Station 41 functions as a bridge between network ring 23 and network ring 25. Station 50 functions as a bridge between network ring 24 and network ring 25.

Also shown in FIG. 1 is a bus network 61 consisting of a bus 62 to which is connected station 51, a station 55, a station 56, a station 57, a station 58, a station 59 and a station 60. Bus network 61 may be, for example, a network designed according to ANSI/IEEE Standard 802.3. Station 51 functions as a bridge between network ring 25 and bus network 61.

Figure 2:
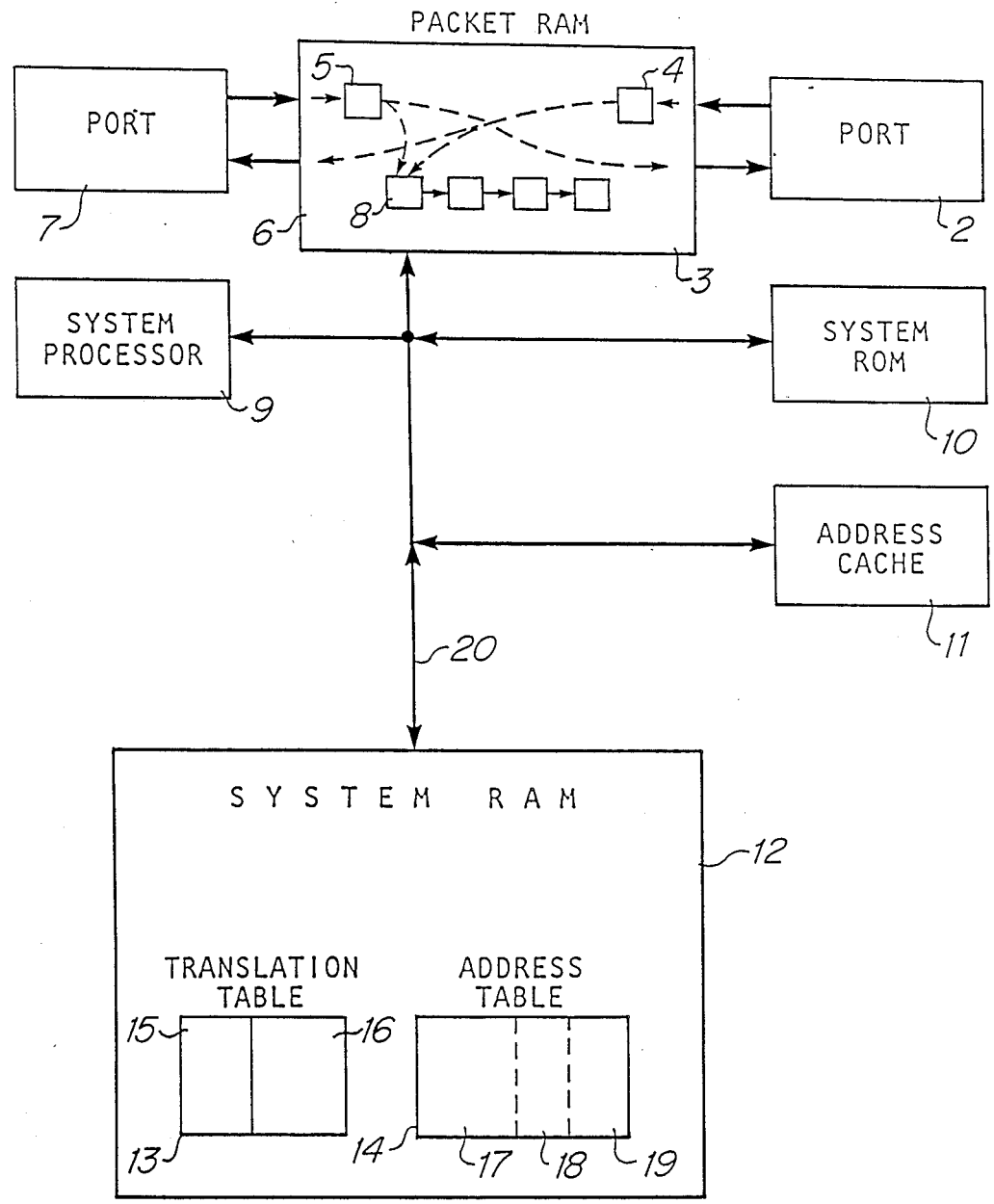
FIG. 2 shows a block diagram of the bridge joining the bus network and the multiple ring network in accordance with the preferred embodiment of the present invention.

FIG. 2 shows a block diagram of station 51. Data frames from network ring 25 are received by and sent from a packet random access memory (RAM) 3 via a port 1. Data frames from bus network 61 are received by and send from packet RAM 3 via a port 2.

A system processor 9 monitors data frames received by packet RAM 3. For example a data frame received from port 1 is loaded into a packet buffer 5. System processor 9 may modify the data frame and direct packet RAM 3 to send the modified data frame to port 2. Alternately, system processor 9 may direct packet RAM 3 to throw away the data frame by attaching packet buffer 5 to unused packet buffers 8.

Similarly, a data frame received from port 2 is loaded into a packet buffer 4. System processor 9 may modify the data frame and direct packet RAM 3 to send the modified data frame to port 1. Alternately, system processor 9 may direct packet RAM 3 to throw away the data frame by attaching packet buffer 4 to unused packet buffers 8.

System processor 9, through a bus 20, accesses a system read-only memory (ROM) 10, an address cache 11 and a system RAM 12. System ROM includes program code executed by system processor 9. An address table 14 within system RAM 12 includes an address column 17, a port number column 18 and a route column 19. Each entry in address table 14 will have an address in column 17, and an associated port number in column 18. The port number indicates the port through which messages need to be sent in order to get to the station bearing the address. An entry whose port number in column 18 indicates "Port 1" will contain a route in column 19 to the station which has the address in column 17. Address table 14 has an entry for every station on bus network 61. Address table 14 also has and entry for every station in the multiple ring network for which it has a route to that station. When a group address is used, this will be flagged in column 18 by the use of a "Port 0". When "Port 0" is encountered in column 18 a translation table 13 will be accessed to perform a group address translation.

Translation table 13 within RAM 12 includes a column 15 and a column 16. Column 15 contains group addresses for bus network 61. Column 16 contains translation of the group addresses in column 15 to addresses which will address a plurality of stations in the ring networks.

Figure 3:
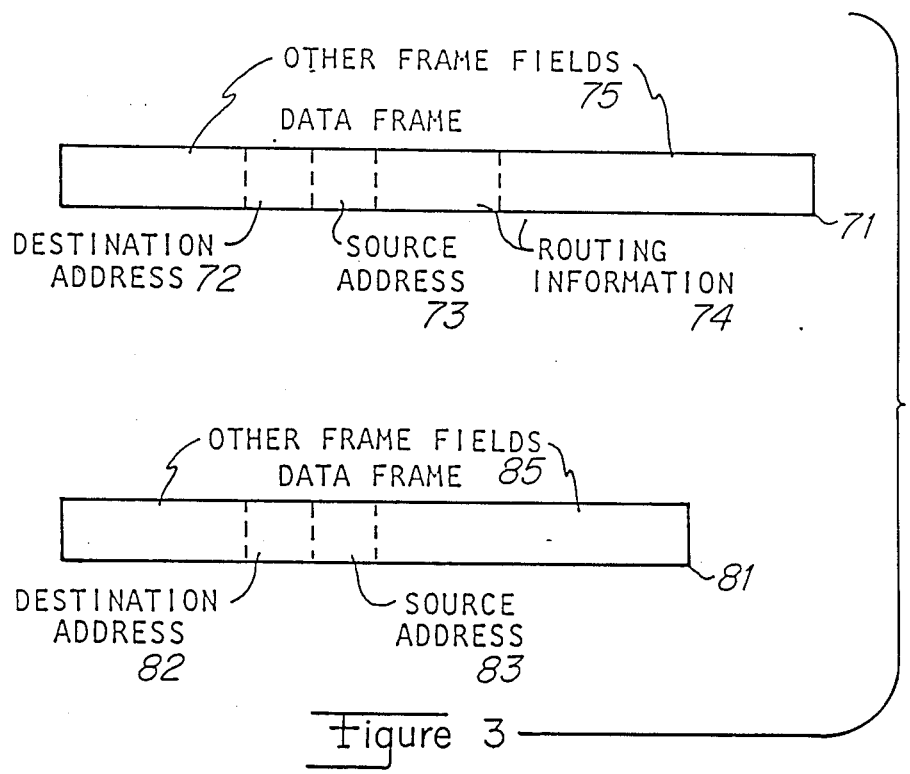
FIG. 3 shows the organization of a data frame used in the multiple ring network shown in FIG. 1 and the organization of a data frame used in the bus network also shown in FIG. 1.

FIG. 3 shows data frame organization for a data frame 71 used in the multiple ring network and data frame organization for a data frame 81 used in bus network 61. Data frame 75 is shown to include a destination address 72, a source address 73, routing information 74 and other frame fields 75. Data frame 85 is shown to include a destination address 82, a source address 83 and other frame fields 85.

Figure 4:
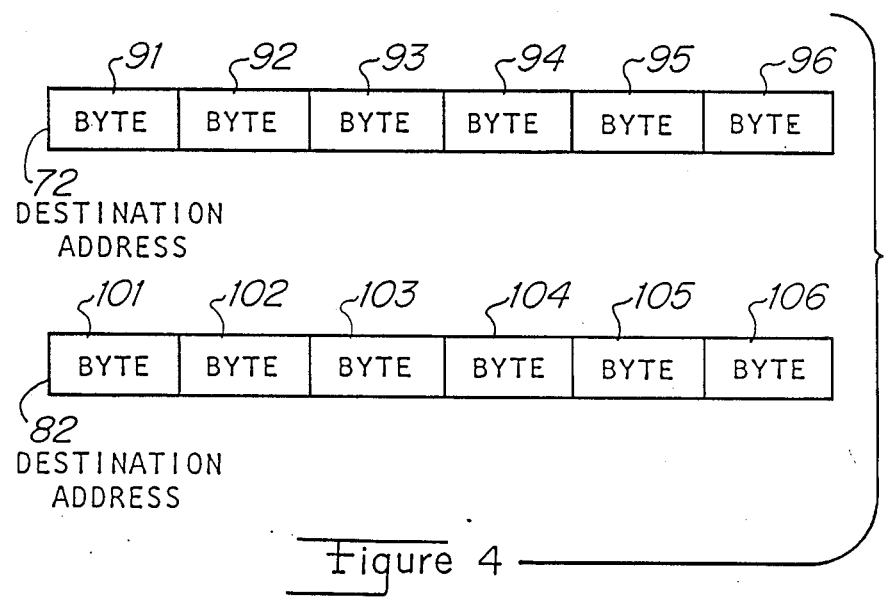
FIG. 4 shows the destination address format used in the data frames shown in FIG. 3.

In FIG. 4 destination address 72 is shown to consist of six 8-bit bytes: an 8-bit byte 91, an 8-bit byte 92, an 8-bit byte 93, an 8-bit byte 94, an 8-bit byte 95 and an 8-bit byte 96. Destination address 82 is shown to consist of six 8-bit bytes: an 8-bit byte 101, an 8-bit byte 102, an 8-bit byte 103, an 8-bit byte 104, an 8-bit byte 105 and an 8-bit byte 106.

A group address for bus network 61 is an address in ordinary format which is, however, recognized by a number of different stations on the bus as being addressed to them. For the multiple ring network, some chip sets which purport to implement network interfaces according to ANSI/IEEE Standard 802.5-1988 Token Ring MAC & PHY Specification Enhancement for Multiple-Ring Networks, notably a chip set made by Texas Instruments Incorporated and a chip set made by International Business Machines Corporation, while not allowing more than one group address allow functional addresses. Functional addresses are a special subset of group addresses defined by ANSI/IEEE Standard 802.5-1988 Token Ring MAC & PHY Specification Enhancement for Multiple - Ring Networks. If the first 16 bits—i.e., byte 91 and byte 92—of a destination address is the hexadecimal number 'C000' and bit 0 of the next byte—byte 93— is '0' then that address is a functional address. The following 31 bits of address in bytes 93, 94, 95, and 96 specify a mask to be used to address the frame to 31 possible groups of at least one station on the multiple ring network. The mask is bit significant, meaning that if a bit is sent a group of at least one station corresponding to the set bit is addressed. Thus a single frame may be addressed to multiple groups of at least one station.

When Packet RAM 3 receives a first data frame with a first destination address from port 2, system processor 9 will compare the first destination address of the first data frame with the entries in address cache 11. If the first destination address matches an entry in address cache 11, that indicates the address is listed in an address table 14 in system RAM 12. System processor 9 will examine the entry with the destination address in column 17. If the port number for the entry is for "Port 2", system processor 9 will instruct Packet RAM 3 to discard the first data frame. There is no need to forward such a data frame since the data frame is already on the correct network.

If the port number for the entry is for "Port 1" system processor 9 will add the route in column 3 to the first data frame. Additionally, system processor 9 will make any other necessary changes to the first data frame to conform the data frame to the format of data frame 71. Then system processor 9 will direct Packet RAM 3 to send the modified data frame out on port 1.

If the port number in column 18 of the entry is for "Port 0", system processor 9 will search column 15 of translation table 13 for an entry with a group address in column 15 that matches the destination address. When the match is found, the functional address in column 16 of the entry is substituted for the destination address in the message. Other necessary changes are made and the data frame is sent out on port 1.

If the first destination address does not match an entry in address cache 11, that indicates that the destination station of the first data frame is addressed to does not reside on bus network 61 and indicates that there is no known route from station 51 to the destination station. System processor 9, therefore, will direct Packet RAM 3 to discard the first data frame. System processor 9 will also construct a new data frame to be sent out on port 1. This new data frame will initiate a route discover process to the station with the first destination address. When packet RAM 3 receives data frames on port 1 in response to the route discover process, these will contain a route to the first destination address. System processor 9 will add the first destination address to address cache 11 and will add an entry to address table 14 which includes the first destination address, and a route to the first destination address. Therefore, the next time packet RAM 3 receives a data frame on port 2 with the first destination address, the packet will be modified and forwarded to port 1 for being sent out on the multiple ring network.

When Packet RAM 3 receives a second data frame with a second destination address from port 1, system processor 9 will compare the second destination address of the second data frame with the entries in address cache 11. If the second destination address matches an entry in address cache 11, that indicates the address is listed in an address table 14 in system RAM 12. System processor 9 will examine the entry with the destination address in column 17. If the port number for the entry is for "Port 1", system processor 9 will instruct Packet RAM 3 to discard the second data frame. There is no need to forward such a data frame since the data frame is already on the correct network.

If the port number for the entry is for "Port 2" system processor 9 will remove the route information from the second data frame. Additionally, system processor 9 will make any other necessary changes to the second data frame to conform the data frame to the format of data frame 81. Then system processor 9 will direct Packet RAM 3 to send the modified data frame out on port 2. Additionally, if there is no entry for the source address in the address cache, system processor 9 will add the source address to address cache 11 and will add an entry to address table 14 which includes the source address, and a route to the source address derived from the route information included in the second data frame. When there is an entry for the source address in the address cache, system processor 9 may elect to update the listed route with the route information included in the second data frame. However, address table 14 never contains more than one entry for each address.

If the port number for the entry is for "Port 0", system processor 9 will search column 16 of translation table 13 for an entry with a functional address in column 16 that matches the destination address. When the match is found, the group address in column 15 of the entry is substituted for the destination address in the message. Other necessary changes are made and the data frame is sent out on port 2.

I claim:

1. A method for handling data frames by a bridge between a first network which implements group addressing and a second network which implements functional addressing but does not provide for multiple group addressing, the method comprising the steps of:
   (a) maintaining a translation table which translates group addresses on the first network into functional addresses on the second network
   (b) receiving a first data frame from the first network;
   (c) when the first data frame has a first group address which addresses stations on the second network, performing the following substeps
      (c1) accessing the translation table to locate a first functional address which is a translation of the first group address,
      (c2) replacing in the first data frame the first group address with the first functional address,
      (c3) forwarding the first data frame onto the second network.

2. A method in claim 1 wherein a portion of the first functional address represents a bit significant mask, each bit in the bit significant mask representing a group of at least one station on the second network.

3. A method as in claim 1 additionally comprising the steps of:
   (d) receiving from the second network a second data frame;
   (e) when the second data frame has a second functional address which addresses stations on the first network, performing the following substeps
      (e1) accessing the translation table to locate a second group address which is a translation of the second functional address,
      (e2) replacing in the second data frame the second functional address with the second group address,
      (e3) forwarding the second data frame onto the first network.

4. A method as in claim 3 wherein a portion of the first functional address represents a bit significant mask, each bit in the bit significant mask representing a group of at least one station on the second network and wherein the second group address is a single address which addresses a plurality of stations on the first network.

5. A bridge providing for communication of data frames between a first network which implements group addressing and a second network which implements functional addressing but does not implement multiple group addressing, the bridge comprising:
   a first memory which receives data frames from the first network and from the second network, the data frames each having a destination;
   a system processor, coupled to the first memory, the system processor monitoring data frames received by the first memory; and,
   a system memory, coupled to the system processor, the system memory including an address table and a translation table, the translation table being accessed to translate group addresses to functional address;
   wherein the address table includes a plurality of entries, each entry having a first field which is a data frame destination address and each entry having a second field which indicates whether the data frame destination address addresses more than a single station; and
   wherein for every data frame destination address in a first field for which a second field indicates the data frame destination address in the first field addresses more than a single station, the translation table contains a group address recognized on the first network and contains a corresponding functional address recognized on the second network.

6. A bridge as in claim 5 wherein when the first memory receives from the first network a first data frame having a first destination address, the system processor searches the address table for the first destination address, and when the system processor determines from the address table that the first destination address addresses more than a single station the system processor searches the translation table for a first group address which matches the first destination address and substitutes for the first destination address a first functional address corresponding to the first group address before forwarding the first data frame on the second network.

7. A bridge as in claim 6 wherein when the first memory receives from the second network a second data frame having a second destination address, the system processor searches the address table for the second destination address, and when the system processor determines from the address table that the second destination address addresses more than a single station the system processor searches the translation table for a second functional address which matches the second destination address and substitutes for the second destination address a second group address corresponding to the second functional address before forwarding the second data frame on the first network.

* * * * *